(12) United States Patent
Artzi et al.

(10) Patent No.: US 8,434,070 B2
(45) Date of Patent: Apr. 30, 2013

(54) GENERATING SPECIFICATIONS OF CLIENT-SERVER APPLICATIONS FOR STATIC ANALYSIS

(75) Inventors: Shay Artzi, Brookline, MA (US); Ryan Berg, Sudbury, MA (US); John T. Peyton, Jr., Arlington, MA (US); Marco Pistoia, Amawalk, NY (US); Manu Sridharan, Boulder, CO (US); Robert Wiener, Framingham, MA (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 12/912,345

(22) Filed: Oct. 26, 2010

(65) Prior Publication Data

US 2012/0102471 A1 Apr. 26, 2012

(51) Int. Cl.
*G06F 9/44* (2006.01)
*G06F 9/45* (2006.01)

(52) U.S. Cl.
USPC ........... 717/135; 717/132; 717/133; 717/131; 717/147; 717/144; 717/146

(58) Field of Classification Search .................. None
See application file for complete search history.

(56) References Cited

U.S. PATENT DOCUMENTS

2006/0179425 A1* 8/2006 Scougall et al. ............. 717/140
2007/0245327 A1* 10/2007 Dietz et al. .................. 717/143

OTHER PUBLICATIONS

Michal Antkiewicz, "Automatic Extraction of Framework-Specific Models from Framework-Based Application Code", Nov. 2007, ACM.*
Tripp et al., "TAJ: Effective Taint Analysis of Web Applications" (PLDI '09: Proceedings of the 2009 ACM SIGPLAN conference on Programming language design and implementation, New York, NY, USA, 2009, pp. 87-97).
Mell, et al., "Draft NIST Working Definition of Cloud Computing," dated Oct. 7, 2009.

* cited by examiner

*Primary Examiner* — Lewis A Bullock, Jr.
*Assistant Examiner* — Mark Gooray
(74) *Attorney, Agent, or Firm* — Stephen Bongini; Fleit Gibbons Gutman Bongini & Bianco PL

(57) ABSTRACT

Systems and methods are provided for creating a data structure associated with a software application that is based on at least one framework. According to the method, source code and at least one configuration file of the software application is analyzed by at least one framework-specific processor so as to determine entry point information indicating entry points in the source code, request attribute access information indicating where attributes attached to a request data structure are read and written, and forward information indicating forwards performed by the software application. A data structure for a static analysis engine is created based on this information. The data structure includes a list of synthetic methods that model framework-related behavior of the software application, and a list of entry points indicating the synthetic methods and/or application methods of the software application that can be invoked by the framework.

14 Claims, 13 Drawing Sheets

. . .                                            ╱—324

Java classes:

```
class UserForm extends ActionForm { private String firstName;
private String lastName;
public String getFirstName() {
return firstName;
}
public void setFirstName(String firstName) {
this.firstName = firstName;
}
public String getLastName() {
return lastName;
}
public void setLastName(String lastName) {
this.lastName = lastName;
}
```

```
                                    }
402 ⤻
        public class UserAction extends Action { public ActionForward execute(ActionMapping mapping, ActionForm form,
            HttpServletRequest request, HttpServletResponse response)
            throws Exception {

404 ⤻
405 ⤻   UserForm userForm = (UserForm) form;
        request.setAttribute("user", userForm);
406 ⤻
        ActionForward forward = mapping.findForward("showuser");
        return forward;

}
        }
```

Contents of a JSP /pages/ShowUser.jsp:

408 ⤻ Name is <%=
((com.ibm.beans.UserForm)request.getAttribute("user")).getFirstName()
%>, 410 ⤻ <%=
((com.ibm.beans.UserForm)request.getAttribute("user")).getLastName()
%>.

```
              <form-beans>
502 ⤳        <form-bean
504 ⤳        name="userForm"
             type="UserForm"/>
             </form-beans>

<action-mappings>
506 ⤳        <action name="userForm"
508 ⤳        path="/user"
             type="UserAction"
510 ⤳        validate--"false">
512 ⤳        <forward name="showuser"
             path="/pages/ShowUser.Jsp"
             redirect-="false"/>
             </action>
             </action-mappings>
```

GENERATING SPECIFICATIONS OF CLIENT-SERVER APPLICATIONS FOR STATIC ANALYSIS

CROSS REFERENCE TO RELATED APPLICATIONS

This application is related to application "Static Analysis of Client-Server Applications Using Framework Independent Specifications," Ser. No. 12/912,382, also US PG Pub 2012/0102474 A1, which was filed on the same day as the present application and commonly assigned therewith to International Business Machines Corporation. This related application is incorporated herein by reference in its entirety.

FIELD OF THE INVENTION

The present invention generally relates to client-server applications, and more particularly relates to static analysis of client-server applications.

BACKGROUND OF THE INVENTION

Modern web applications are often built atop web frameworks, which ease development by automatically handling common tasks such as unmarshalling request data into an object and connecting business logic to display code. Web applications based on such frameworks are often assembled via configuration files that are separate from the source code of the web application. These configuration files can control how the application code is invoked, what data is passed to the application, and the like. This architecture makes traditional static analysis of such applications ineffective because traditional static analysis methods only process the source code of the web application and libraries and do not process the configuration files. While a static analysis engine can be enhanced to parse and understand the semantics of the configuration files, this technique requires modifying the analysis engine for each new framework, which is error-prone and requires significant implementation effort.

SUMMARY OF THE INVENTION

One embodiment provides a method for creating a data structure associated with a software application that is based on at least one framework. According to the method, source code and at least one configuration file of the software application is analyzed by at least one framework-specific processor so as to determine entry point information indicating entry points in the source code, request attribute access information indicating where attributes attached to a request data structure are read and written, and forward information indicating forwards performed by the software application. A data structure for a static analysis engine is created based on the entry point information, the request attribute access information, and the forward information. The data structure includes a list of synthetic methods that model framework-related behavior of the software application, and a list of entry points indicating the synthetic methods and/or application methods of the software application that can be invoked by the framework.

Another embodiment provides an information processing system for creating a data structure associated with a software application that is based on at least one framework. The information processing system includes at least one framework-specific processor for analyzing source code and at least one configuration file of the software application so as to determine entry point information indicating entry points in the source code, request attribute access information indicating where attributes attached to a request data structure are read and written, and forward information indicating forwards performed by the software application. The information processing system also includes a formatter for creating a data structure for a static analysis engine based on the entry point information, the request attribute access information, and the forward information. The data structure includes a list of synthetic methods that model framework-related behavior of the software application, and a list of entry points indicating the synthetic methods and/or application methods of the software application that can be invoked by the framework.

A further embodiment provides a non-transitory machine readable medium encoded with a program for creating a data structure associated with a software application that is based on at least one framework. The program includes instructions for analyzing, by at least one framework-specific processor, source code and at least one configuration file of the software application so as to determine entry point information indicating entry points in the source code, request attribute access information indicating where attributes attached to a request data structure are read and written, and forward information indicating forwards performed by the software application. The program also includes instructions for creating a data structure for a static analysis engine based on the entry point information, the request attribute access information, and the forward information. The data structure includes a list of synthetic methods that model framework-related behavior of the software application, and a list of entry points indicating the synthetic methods and/or application methods of the software application that can be invoked by the framework.

Yet another embodiment provides a non-transitory computer readable storage medium encoded with a data structure for a static analysis engine. The data structure is associated with a software application that is based on at least one framework. The data structure includes a list of synthetic methods that model framework-related behavior of the software application, and a list of entry points indicating the synthetic methods and/or application methods of the software application that can be invoked by the framework. The data structure is in a framework independent format that is independent of the at least one framework on which the software application is based.

Other objects, features, and advantages of the present invention will become apparent from the following detailed description. It should be understood, however, that the detailed description and specific examples, while indicating various embodiments of the present invention, are given by way of illustration only and various modifications may naturally be performed without deviating from the present invention.

BRIEF DESCRIPTION OF THE DRAWINGS

FIGS. 3 and 4 illustrate exemplary source code for a web application in accordance with one embodiment of the present invention;

FIG. 5 illustrates an exemplary a configuration file for a web application in accordance with one embodiment of the present invention;

DETAILED DESCRIPTION

Various embodiments of the present invention will be discussed in detail hereinbelow with reference to the attached drawings.

One of the advantages of embodiments of the present invention is that framework application models/specifications are generated for web applications that describe the framework-based behaviors of the applications in a framework independent way. These models/specifications allow one or more static analysis engines to analyze the models/specifications without knowledge of framework semantics. This significantly reduces the burden on the static analysis engines.

Figure 1:
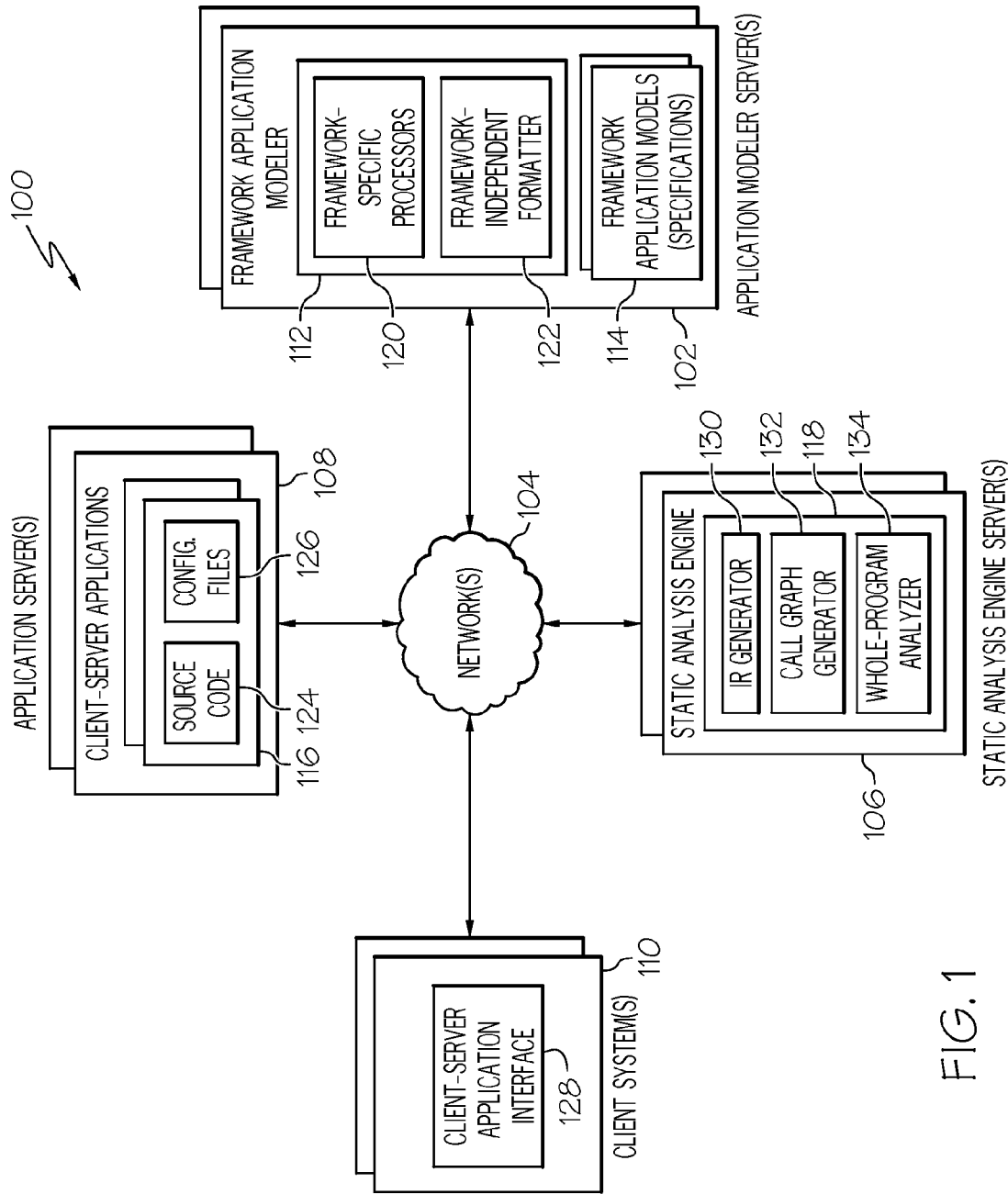
FIG. 1 is a block diagram illustrating an exemplary operating environment applicable to some embodiments of the present invention.

FIG. 1 shows an exemplary operating environment applicable to some embodiments of the present invention. This operating environment 100 can be a cloud computing environment, a non-cloud computing environment, or a combination of both. The operating environment 100, in the illustrated embodiment, comprises one or more application modeler servers 102 communicatively coupled to one or more networks 104. One or more static analysis engine servers 106 are also communicatively coupled to the network(s) 104. Also, one or more application servers 108 and one or more client systems 110 are communicatively coupled to the network(s) 104. The network(s) 104, in this embodiment, comprises one or more types of networks, such as wide area networks, local area networks, and/or wireless networks.

The client system(s) 110 comprises a client-server application interface 128, such as a web browser, a mashup, an application, or the like, for interacting with one or more client-server applications 116, such as a framework application (e.g., web application) residing at the application server(s) 108. The application modeler server(s) 102, in this embodiment, comprises a framework application modeler 112. The framework application modeler 112 generates framework application models 114 (also referred to as "specifications" or "web application specifications") describing the framework-based behaviors in client-server applications 116 such as web applications. (While "client-server applications" are sometimes referred to as "web applications" or "framework applications", client-server applications are not limited to only these types of applications.)

The framework application modeler 112 utilizes a single specification language that is employed across all frameworks. A web application framework is a type of framework/foundation used to build web applications and provide core functionality that is common to most web applications. The specifications 114 express the meaning of the varying framework configuration files 126. This significantly reduces the burden on the core static analysis engine 118 because the static analysis engine 118 is no longer required to understand the semantics of many different web frameworks. The static analysis engine 118 only needs to understand the constructs in the single specification language of the web application specifications 114.

In this embodiment, the framework application modeler 112 comprises a set of framework specific processors 120 and a framework-independent formatter 122. These components are utilized by the framework application modeler 112 to analyze the source code 124 and configuration files 126 of a web application 116 residing at the application server(s) 108 for generating the web application specifications 114. In further embodiments, one or more components of the framework application modeler 112 reside outside of the modeler 112 and/or across one or more other servers.

The static analysis engine server(s) 106, in this embodiment, comprises one or more static analysis engines 118. The static analysis engine 118 performs static code analysis operations. Static code analysis is the analysis of code fragments of an application without actually executing programs built from that code. The term applies to analysis performed by an automated tool, while human analysis is called program understanding, program comprehension, or code review.

The static analysis engine 118 comprises an intermediate representation ("IR") generator 130, a call graph generator 132, and a whole-program analyzer 134. The static analysis engine 118 utilizes these components 130, 132, and 134 to analyze the web application specifications (such as the specifications 114 generated by the modeler 112 or specifications manually written by a human with the proper format), which are comprised of a specification language that is independent of any particular framework. Using these specifications, the static analysis engine 118 is able to properly model framework behavior without the need to directly understand framework-specific configuration files. Therefore, support for new frameworks can be added without modifying the static analysis engine 118 of the present invention. This is in contrast to conventional static analysis engines that require per-framework modifications to the analysis engine.

The static analysis engine 118 of the present invention also has greater flexibility than conventional engines because the processing of specifications 114 by the engine 118 is decoupled from the generation of the specifications 114. This allows new analysis algorithms to be employed more easily than in conventional static analysis engines. In further embodiments, one or more components of the static analysis engine 118 reside outside of the engine 118 and/or across one or more other servers. Also, in some embodiments, the framework application modeler 112 and the static analysis engine 118 reside on the same server.

Figure 2:
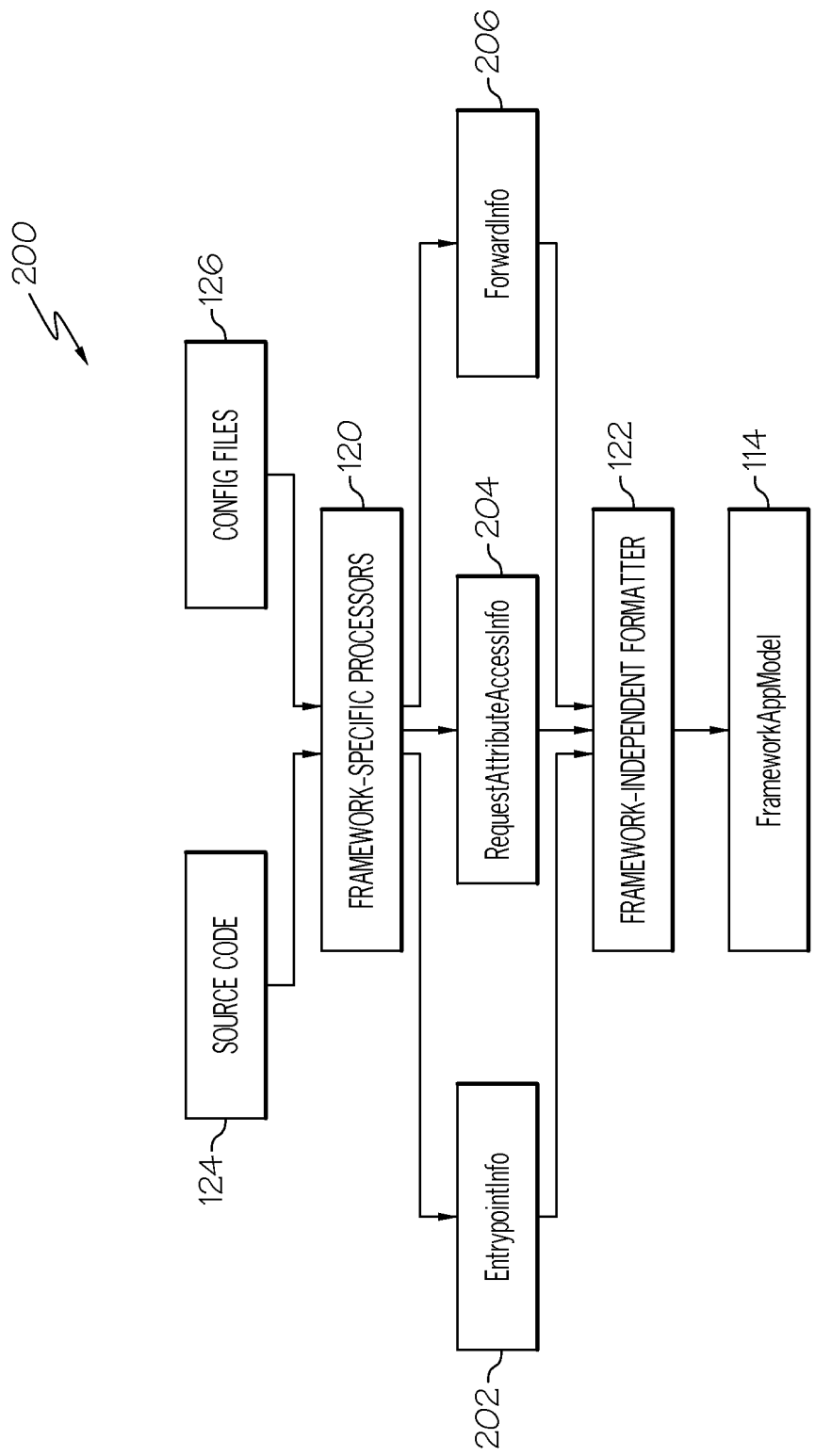
FIG. 2 illustrates a functional operational flow diagram for generating a framework independent specification of a web application according to one embodiment of the present invention.

The following is a detailed discussion on how the framework application modeler 112 and its components 120 and 122 generate framework independent specifications 114 for web applications 116. FIG. 2 illustrates a functional operational flow diagram for generating a framework independent specification of a web application according to one embodiment of the present invention. As shown, one or more framework-specific processors 120 receive as input the source code 124 and configuration files 126 associated with a given web application 116. The source code 124 is the actual source code for a frameworks-based web application 116. The configuration files 126 configure how the framework associated with the web application 116 instantiates the source code 124 of the web application 116. In some embodiments, the source code 124 and the configuration files 126 reside within the same file.

FIGS. 3 and 4 show a portion of exemplary source code for a web application built on the Apache Struts web application framework. The source code 324 begins in FIG. 3 and is continued in FIG. 4. FIG. 5 shows a portion of an exemplary configuration file for the Apache Struts web application framework.

The set of framework-specific processors 120 is a set of framework modules that each understands the semantics of a particular framework. Each framework module inspects the source code and configuration files. If the web application 116 is determined to be employing a given framework, the framework module corresponding to that framework then proceeds to extract a given set of information associated with the web application 116 from the corresponding configuration file 126. In some embodiments, this given set of information is common across most or all frameworks. In the illustrated embodiment, the given set of information is Entry Point Information 202, Request Attribute Access Information 204, and Forward Information 206. If a web application uses multiple frameworks, then multiple framework processors are applied to that single web application. In such a case, the output of each framework processor 120 are merged to produce the final overall output.

With respect to Entry Point Information 202, the framework-specific processors 120 capture information regarding the entry points in the source code 124 invoked by the framework. This information can include any or all of the following types of information: (1) information on the signature of the entry point method, (2) information on how one or more data structures are initialized before being passed to the entry point, and (3) URL information indicating how visiting a given URL in the running application may cause the entry point to be executed.

Examples will now be given with respect to the source code in FIGS. 3 and 4 and the configuration file in FIG. 5. For information on the signature of the entry point method, because an Action named UserAction (line 402) is appropriately referenced in the configuration file 526 at line 502, the following is an example of the corresponding signature.

UserAction.execute(org.apache.struts.action.Action-
Mapping;org.apache.struts.action.Action
Form;javax.servlet.http.HttpServletRequest javax.servlet.http.HttpServletResponse):org.apache.struts.
action.Action Forward For information on how one or more data structures are initialized before being passed to the entry point, for the entry point UserAction.execute( ) at line 402, this information indicates that this entry point is invoked with a data structure UserForm (at line 404) that is passed as second argument with tainted properties (in this example), based on name="userForm" (at line 502) under action declaration and form-bean with type="UserForm" (at line 504). For URL information, the information can indicate that visiting "/user" (as shown at line 506) results in UserAction.execute( ) to run.

With respect to Request Attribute Access Information 204, this information indicates where attributes attached to the HTTP request data structure are read and written. For example, based on the exemplary source code of FIGS. 3 and 4, the processor 120 determines that the attribute "user" is set in UserAction.execute( ) The processor 120 also determines that the attribute "user" is read twice in "/pages/ShowUser.jsp (at line 512).

With respect to Forward Information 206, this is information regarding internal or external forwards performed by the web application 116. For example, the Forward Information 206 can indicate that a particular method call in an application invokes a framework method that causes a forward to some other URL. Also, the Forward Information 206 can indicate that after executing a given entry point method in the web application 116 the framework then automatically forwards to a given URL, based on analyzing the possible return values of the method. For example, the processor can determine that after execution of UserAction.execute( ) /pages/Show User.jsp is displayed. This determination is based on code analysis of UserAction.execute( ) in particular code Action-Forward forward=mapping.findForward("showuser") at line 406; and on the declaration of the forward with name="showuser" (at line 510).

The information 202, 204, and 206 extracted by the framework-specific processors 120 is the then passed to the framework-independent formatter 122. The framework-independent formatter 122 is a processor that takes the Entry Point Information 202, Request Attribute Access Information 204, and Forward Information 206 and produces the final framework application model 114. This final framework application module 122 does not embody any framework-specific knowledge; framework-specific knowledge is confined to the framework-specific processors 120.

Figure 6:
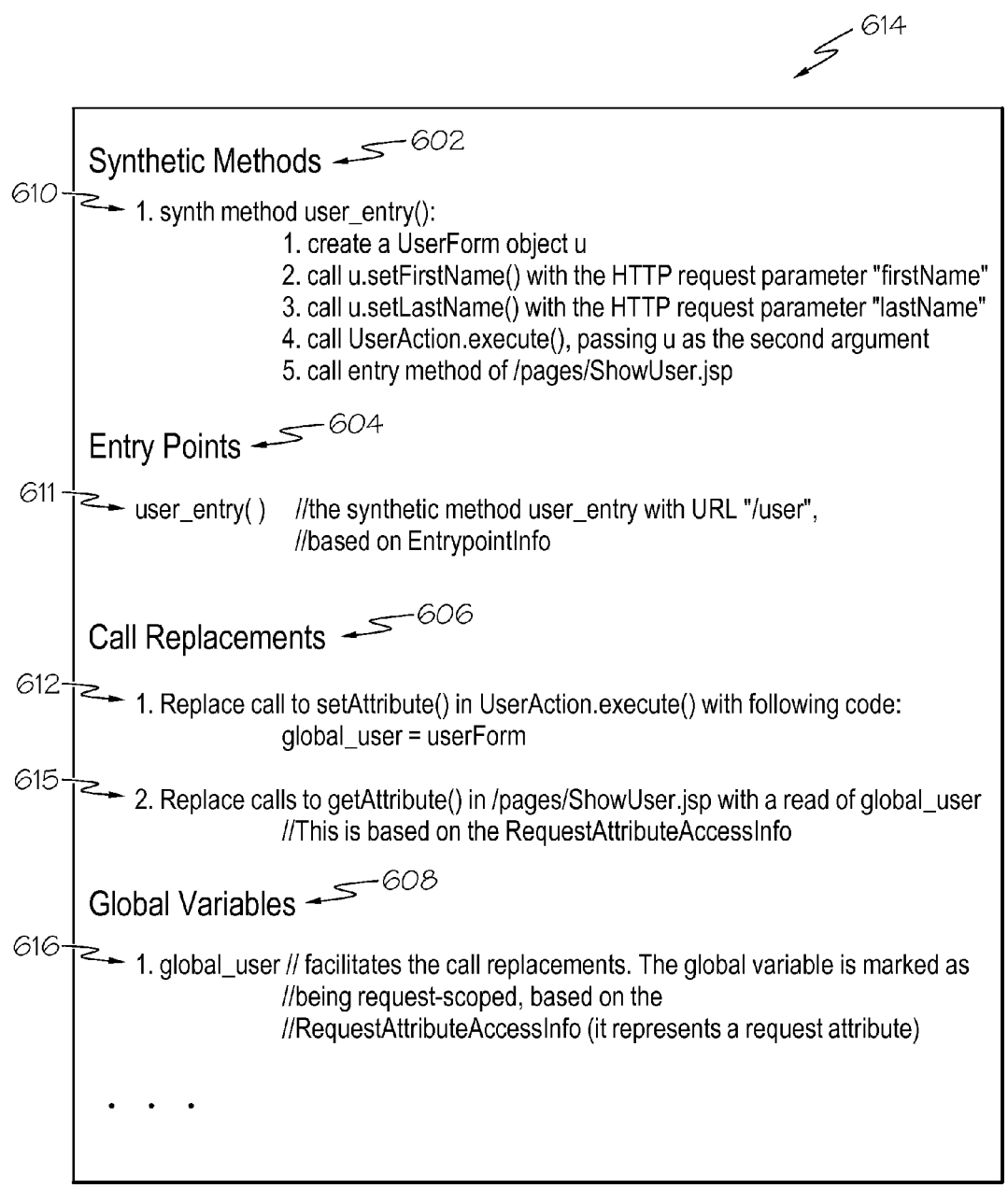
FIG. 6 illustrates a framework independent specification for a web application that is consumable by a static analysis engine according to one embodiment of the present invention.

The framework application model, in this embodiment, is a data structure that models framework-related behavior in the given web application 116. This data structure 614 comprises, in this embodiment, a list of synthetic methods 602, a list of entry points 604, a list of call replacements 606, and a list of global variables 608, as shown in FIG. 6. The synthetic methods provide a flexible way to model a number of framework-related behaviors of the web application. For example, synthetic methods can be used to model how a web framework populates a bean object with request data and passes it to an application method (information embodied in aspect (2) of the Entry Point Information 202 discussed above). FIG. 6 shows a synthetic method 610, "user_entry( )", that (1) creates a UserForm object u; (2) calls u.setFirstName( ) with the HTTP request parameter "firstName"; (3) calls u.setLastName( ) with the HTTP request parameter "lastName"; and (4) then calls UserAction.execute( ) passing u as the second argument. A synthetic method 602 can also reflect some of the Forward Information 204 (e.g., by invoking the application entry point method and then invoking the entry point of the forward target). As an example, FIG. 6 shows that the synthetic method 604 "user_entry( )" (5) calls an entry method of /pages/ShowUser.jsp.

The list of entry points 604 specifies the application methods that can be invoked by the underlying web framework, corresponding to the signatures stored in the Entry Point Information 202. Also, the framework-independent formatter 122 can associate arbitrary metadata with the entry points. For example, it is useful to associate each entry point with a corresponding URL that causes the entry point to execute when visited (this information is also stored in the Entry Point Information 202). In addition to application methods, synthetic methods can be listed as entry points in order to model more complex framework behaviors such as forwards. For example, FIG. 6 shows that "user_entry( )" (the synthetic method 610) with URL "/user", which is based on Entry Point Information 202 discussed above, is listed as an entry point 611.

Call replacements in the list of call replacements 606 provide a mechanism by which method calls in the web application 116 can be replaced with other code that exposes underlying behavior to the static analysis engine 118 in a more consumable fashion. For example, method calls performing forwards to URLs can be replaced with direct invocations of the entry point of the forward target. Also, method calls that read and write session or request attributes can be replaced with direct accesses to new global variables. For example, FIG. 6 shows a first call replacement 612 that replaces a call to setAttribute( ) (shown at line 405) in UserAction.execute( ) with the following code global_user=userForm (where "global_user" is a global variable 616). A second call replacement 615 replaces calls to getAttribute( ) (at lines 408 and 410) in /pages/ShowUser.jsp with a read of global_user (this is all based on the Request Attribute Access Information 204).

The list of global variables 608 comprises additional variables that facilitate the modeling of data flow through framework constructs. The variables can be accessed either in the synthetic methods or the call replacements discussed above. Global variables can also have associated metadata. For example, it is useful to distinguish request-scoped variables in web applications, which are implicitly nulled out by the framework after each request, from session-scoped variables, which can retain live data across requests. For example, FIG. 6 shows a global variable 616 "global_user" that facilitates the call replacements 612 and 615 under the list of call replacements 606. The global variable, in this example, is marked as being request-scoped, based on the Request Attribute Access Information 204 (i.e., it represents a request attribute).

In this manner, the framework application modeler 112 generates framework application models/specifications 114 that describe the framework-based behaviors in web applications in a framework independent way. These models/specifications 114 allow one or more static analysis engines 118 to analyze the models/specifications 114 without knowledge of framework semantics. This significantly reduces the burden on the static analysis engines.

Figure 7:
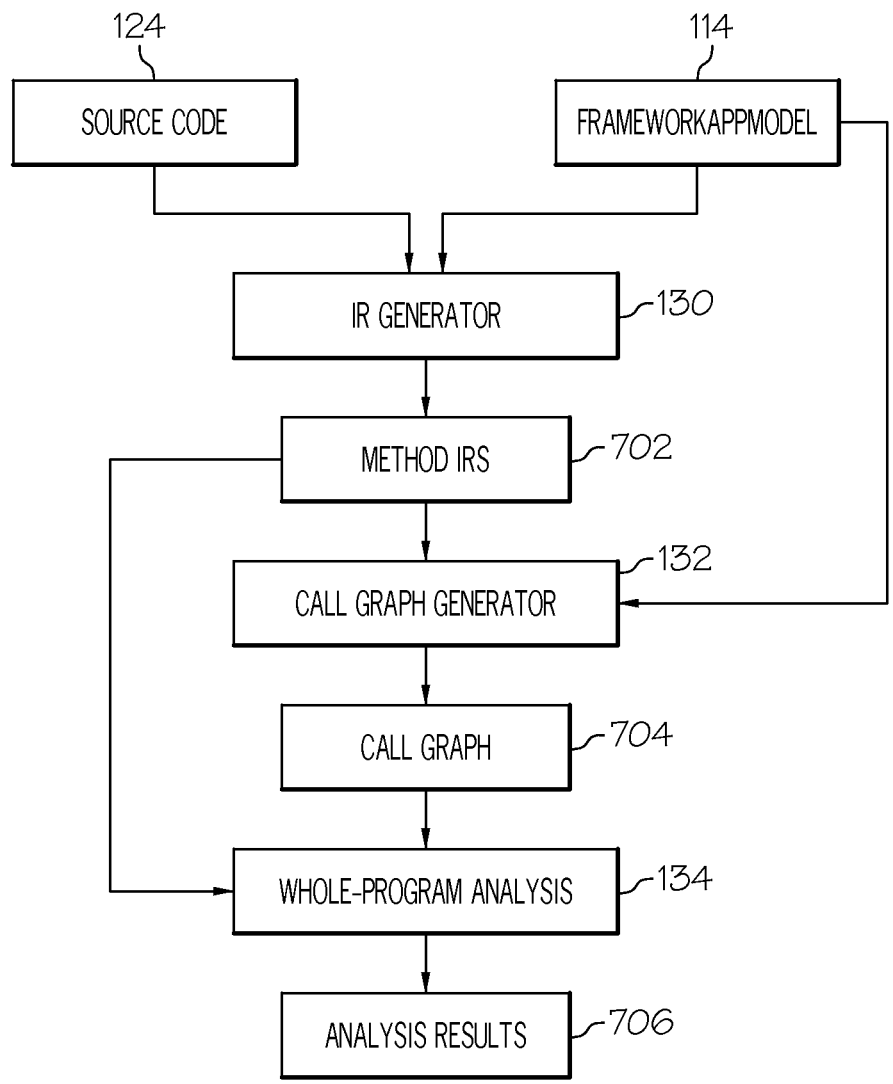
FIG. 7 illustrates a functional operational flow diagram for utilizing framework independent specifications of a web application according to one embodiment of the present invention.

As discussed above, the web application specifications 114 can then be used by a static analysis engine 118 to model framework behavior without the need to directly understand framework-specific configuration files. FIG. 7 illustrates a functional operational flow diagram for utilizing a framework independent application specification according to one embodiment of the present invention. The application specification is the framework application model/specification discussed above or a specification having a format of the type discussed above. The diagram of FIG. 7 illustrates an exemplary use of framework application models in a static analysis process in accordance with one embodiment of the present invention, and other static analysis processes can be used in further embodiments.

As shown in FIG. 7, the source code 124 and the framework application model 114 for a given web application 116 are used as inputs by the IR generator 130. The IR generator 130 is a module that generates an intermediate representation (IR) for the source code 124. An intermediate representation is a data structure that is generated from program input data and from which output data of the program can be constructed, and is a version of the original source code that is machine and language independent. The framework application model 114 is used by the IR generator 130 to additionally generate IR for the synthetic methods 602 in the model 114.

The framework application model 114 is also used by the IR generator 130 to modify the IR of given application methods based on the call replacement information 612 and 615.

As an example, the IR generator 130 generates IR for the user_entry( ) synthetic method 610 in the exemplary specification 614 of FIG. 6. Also, the IR for UserAction.execute( ) and /pages/ShowUser.jsp is modified according to the call replacements 612 and 615. The global variables can be handled in multiple ways in this phase. In one embodiment, new global variables are generated in the IR, or new method parameters are added to the IR to model the flow of data through the global variables. For example, a new global variable, "global_user", is declared in the IR based on the global variable information 616 in the exemplary framework application model of FIG. 6.

This output (e.g., IR for both application methods and synthetic methods from the framework application model 114) of the IR generator 130 is shown in FIG. 7 as method IRs 702. These method IRs 702 are used as input by the call graph generator 132. The call graph generator 132 generates call graphs 704 that model which synthetic methods and/or application methods of the web application can invoke other synthetic methods or application methods of the web application. In this embodiment, the call graph generator 132 utilizes information in the framework application model 114 when creating a call graph 704. As an example, the call graph generator 132 uses the entry point information 611 in the model 614 to determine potential root methods for the call graph 704. Using the information shown in the exemplary model 614, user_entry( ) 611 is treated as an entry point by the call graph generator 132, as shown in the exemplary call graph of FIG. 13. The analysis of methods with modified IRs due to call replacements, as discussed above, is affected. For example, UserAction.execute( ) no longer calls setAttribute( ) due to the first call replacement 612 shown in FIG. 6.

Figure 13:
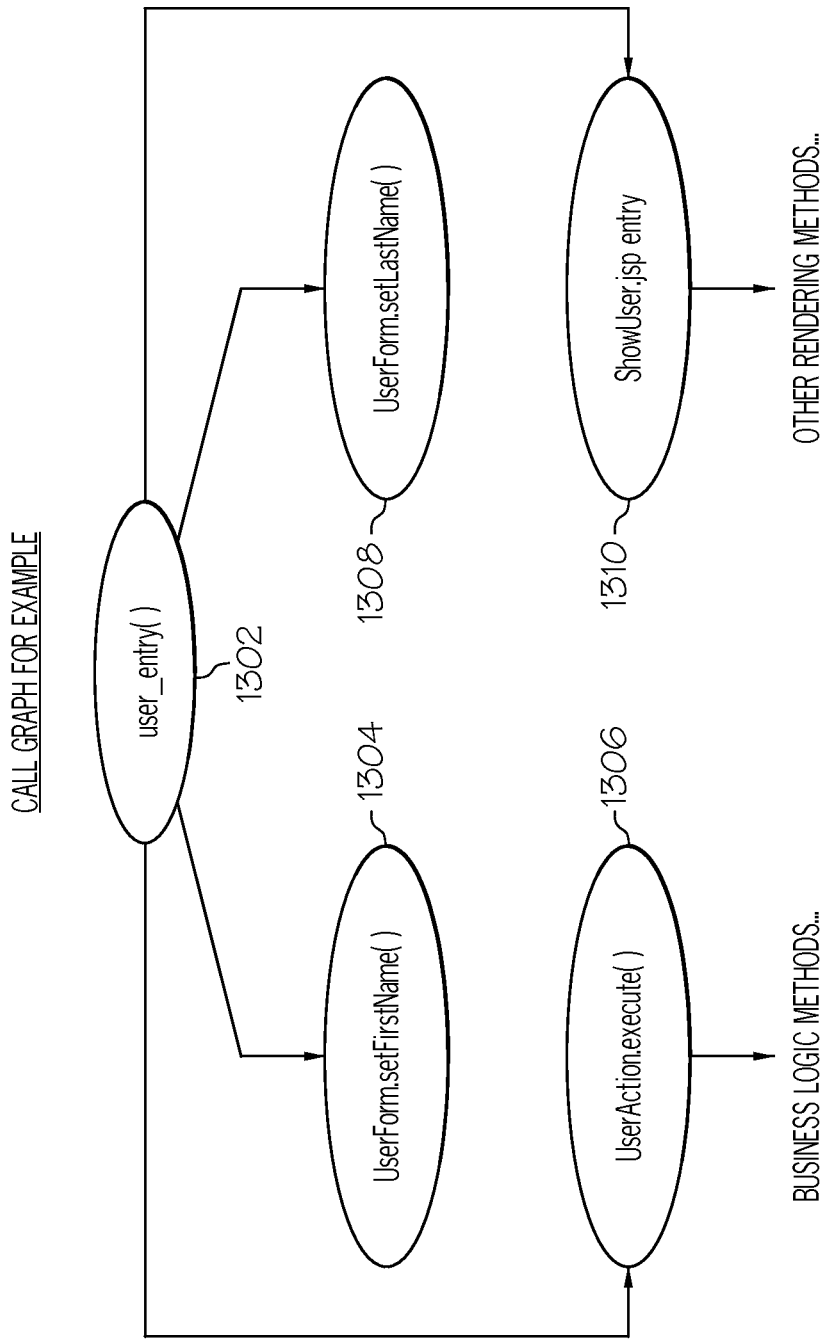
FIG. 13 shows a call graph according to one embodiment of the present invention.

As an example, FIG. 13 shows that user_entry( ) at root node 1302, calls UserForm.setFirstName( ) at node 1304, and UserAction.execute( ) at node 1306. UserAction.execute( ) goes on to call other business logic methods. FIG. 13 also shows that user_entry( ) calls UserForm.setLastName( ) at node 1308, and ShowUser.jsp entry, at node 1310. Show User.jsp entry goes on to call other rendering methods.

The call graphs 704 and the method IRs 702 are used as inputs by a whole-program analyzer 134. The whole-program analyzer 134 is any whole-program static analysis process. For example, this static analysis process can be a tainted data analysis for finding security vulnerabilities in web applications. This whole-program analyzer 134 does not just utilize call graphs that were generated from source code, but utilizes method IRs 702 and call graphs 704 that are based on the source code 124 and the framework application model 114 of the given web application 116. One example of a whole-program taint analysis process is provided in Tripp et al., "TAJ: Effective Taint Analysis of Web Applications" (PLDI '09: Proceedings of the 2009 ACM SIGPLAN conference on Programming language design and implementation, New York, N.Y., USA, 2009, pp. 87-97), which is herein incorporated by reference. Using the method IRs 702 and call graphs 704, the whole-program analyzer 134 generates analysis results 706 as its output. In one example, the whole-program analyzer 134 performs a tainted data analysis and this output is a list of security vulnerabilities in the web application. These results are enhanced by the framework application model and method IRs based thereon, as compared to analyzing the source code alone, because the use of the framework application model exposes more application semantics to the analyzer.

As an example, if the analysis is trying to find tainted data security bugs for a web application corresponding to the source code 324 and configuration files 526 shown in FIGS.

3-5, the following bug would be discovered: tainted data is read from the HTTP request parameter "firstName" and printed to the user in /pages/ShowUser.jsp. The data flow is via the UserForm created in user_entry( ) which is then stored in the global_user global variable in UserAction.execute( ) (via the call replacement). The UserForm is read back from global_user in /pages/ShowUser.jsp (again via call replacements), which then prints the first name. Thus, the information in the model 614 enables discovery of this bug.

Figure 8:
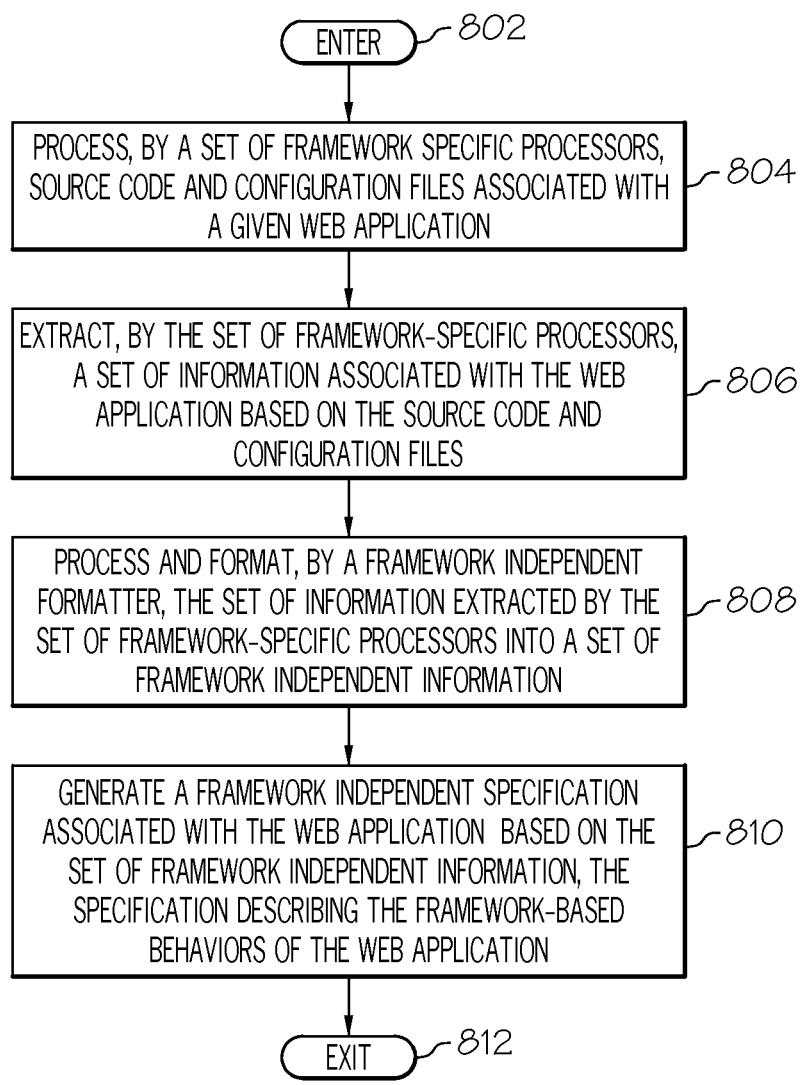
FIG. 8 is an operational flow diagram for generating framework independent specifications for web applications according to one embodiment of the present invention.

FIG. 8 is an operational flow diagram for generating framework independent specifications for web applications according to one embodiment of the present invention. The operational flow diagram of FIG. 8 begins at step 802 and flows directly to step 804. A set of framework-specific processors 120 within the framework application modeler 112 process source code 124 and configuration files 126 associated with a given web application 116, at step 804. The set of framework-specific processors 120 extracts a set of information associated with the web application 116 based on the source code 124 and configuration files 126, at step 806. A framework independent formatter 122 within the modeler 112 processes and formats the set of information extracted by the set of framework-specific processors 120 into a set of information that is framework independent, at step 808. The framework application modeler 112 then generates a framework independent specification 114 for the web application 116 that describes framework-based behaviors of the web application 116, at step 810. The control flow then exits at step 812. (The steps of the process of FIG. 8 are discussed above in greater detail with reference to FIGS. 1-6.)

Figure 9:
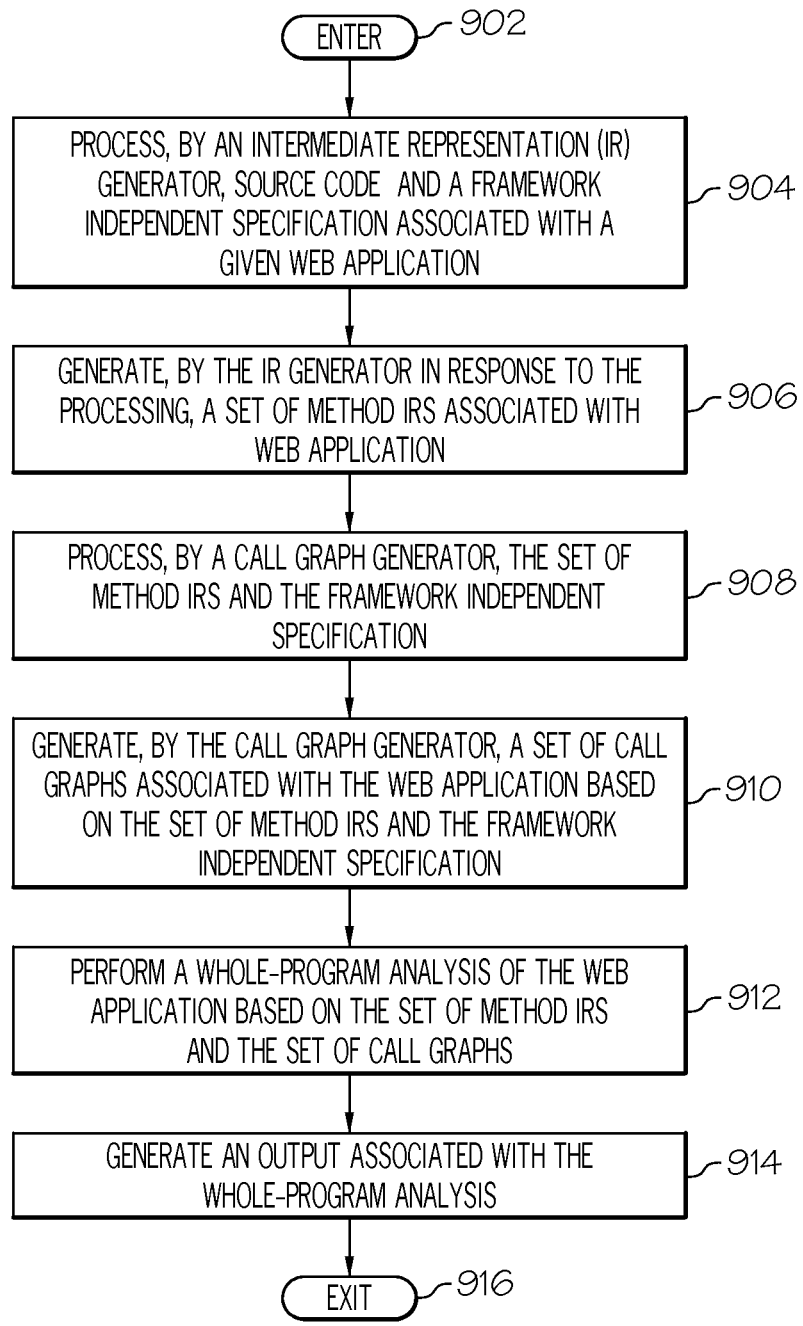
FIG. 9 is an operational flow diagram for utilizing framework independent specifications for web applications to perform a static analysis according to one embodiment of the present invention.

FIG. 9 is an operational flow diagram for utilizing framework independent specifications for web applications to perform a static analysis according to one embodiment of the present invention. The operational flow diagram of FIG. 9 begins at step 902 and flows directly to step 904. An IR generator 130 within a static analysis engine 118 processes source code 124 and the framework independent specification 114 associated with a given web application, at step 904. The IR generator 130 then generates a set of method IRs 702 associated with the web application 116, at step 906. A call graph generator 132 within the static analysis engine 118 processes the set of method IRs 702 and the framework independent specification 114, at step 908.

The call graph generator 132 then generates a set of call graphs 704 associated with the web application 116 based on the set of method IRs 702 and the framework independent specification 114, at step 910. The static analysis engine 118 performs a whole-program analysis of the web application based on the set of method IRs 702 and the set of call graphs 704, at step 912. The static analysis engine 118 then generates an output 706 associated with the whole-program analysis, at step 914. The control flow then exits at step 916. (The steps of the process of FIG. 9 are discussed above in greater detail with reference to FIG. 7.)

While the following is a detailed discussion on cloud computing, implementation of the teachings of the present invention are not limited to a cloud computing environment. Rather, embodiments of the present invention are capable of being implemented in conjunction with any type of computing environment now known or later developed. For example, embodiments of the present invention are applicable to a computing environment with a virtualized infrastructure or any other type of computing environment.

For convenience, this Detailed Description includes the definitions below that have been derived from "Draft NIST Working Definition of Cloud Computing," by Peter Mell and Tim Grance, dated Oct. 7, 2009, which is herein incorporated by reference. However, cloud computing environments that are applicable to one or more embodiments of the present invention are not required to correspond to the definitions and characteristics given below or in the "Draft NIST Working Definition of Cloud Computing" publication. The following definitions, characteristics, and discussions of cloud computing are given only as non-limiting examples.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
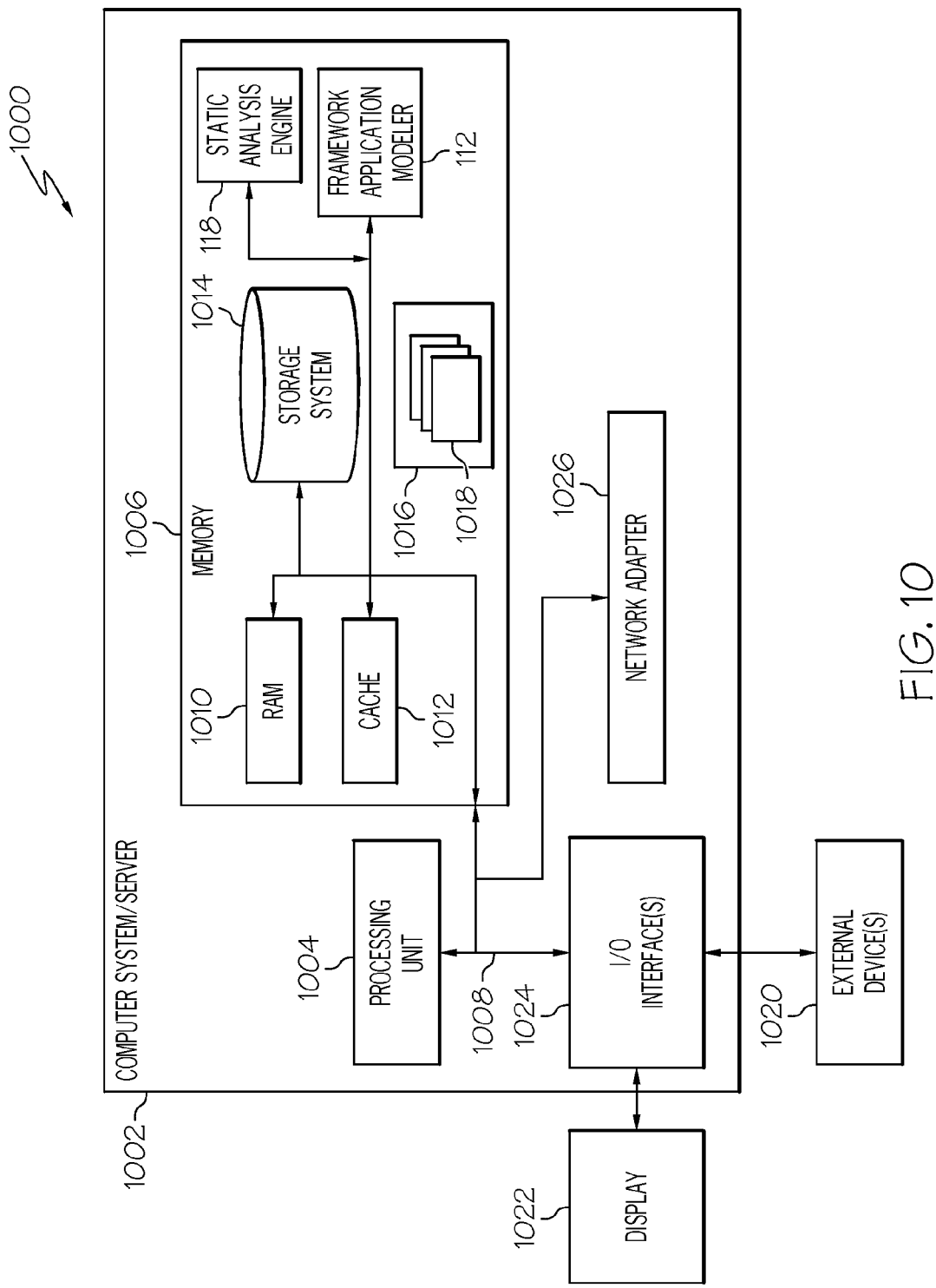
FIG. 10 illustrates a cloud computing node according to one embodiment of the present invention.

FIG. 10 shows a schematic of an exemplary cloud computing node. Cloud computing node 1000 is only one example of a suitable cloud computing node and is not intended to suggest any limitation as to the scope of use or functionality of embodiments of the invention described herein. Regardless, cloud computing node 1000 is capable of being implemented and/or performing any of the functionality set forth hereinabove.

In cloud computing node 1000 there is a computer system/server 1002, which is operational with numerous other general purpose or special purpose computing system environments or configurations. Examples of well-known computing systems, environments, and/or configurations that may be suitable for use with computer system/server 1002 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1002 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, a computer system/server 1002 (such as information processing system 100 in FIG. 1) in cloud computing node 1000 is shown in the form of a general-purpose computing device. It should be noted that this system 1002 is not required to reside within a cloud computing environment and can reside in a non-cloud computing environment as well. The components of computer system/server 1002 may include, but are not limited to, one or more processors or processing units 1004, a system memory 1006, and a bus 1008 that couples various system components including system memory 1006 to processor 1004.

Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006, in one embodiment, comprises the framework application modeler 112 and its components and also the static analysis engine 118 and its components, as described above. These components can also be implemented in hardware as well. The system memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1014 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1016, having a set (at least one) of program modules 1018, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1018 generally carry out the functions and/or methodologies of embodiments of the invention as described herein.

Computer system/server 1002 may also communicate with one or more external devices 1020 such as a keyboard, a pointing device, a display 1022, etc.; one or more devices that enable a user to interact with computer system/server 1002; and/or any devices (e.g., network card, modem, etc.) that enable computer system/server 1002 to communicate with one or more other computing devices. Such communication can occur via I/O interfaces 1024. Still yet, computer system/server 1002 can communicate with one or more networks such as a local area network (LAN), a general wide area network (WAN), and/or a public network (e.g., the Internet) via network adapter 1026. As depicted, network adapter 1026 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

Figure 11:
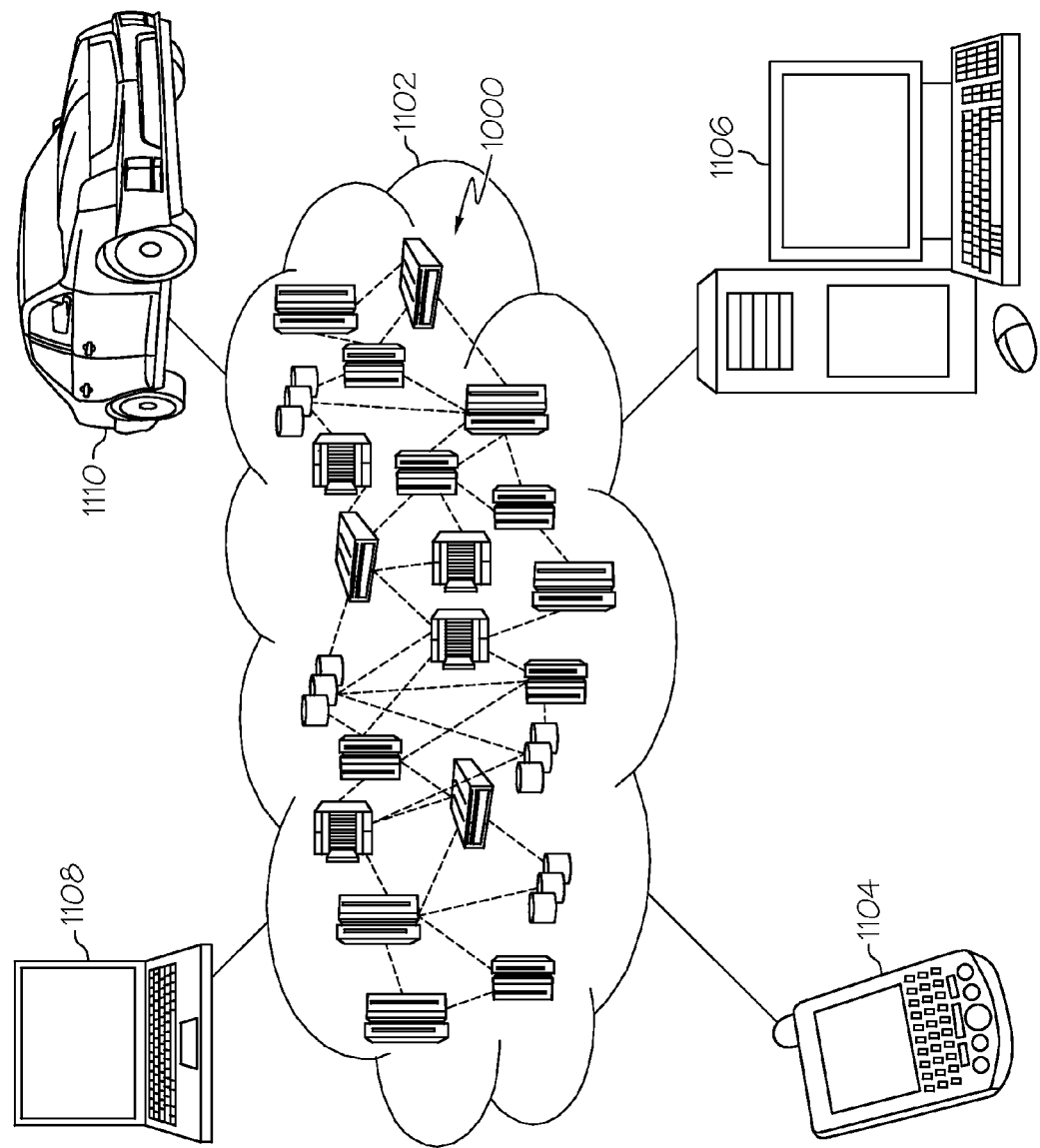
FIG. 11 illustrates a cloud computing environment according to one embodiment of the present invention.

FIG. 11 depicts an illustrative cloud computing environment. As shown, the cloud computing environment 1102 comprises one or more cloud computing nodes 1000 with which local computing devices used by cloud consumers, such as, for example, personal digital assistant (PDA) or cellular telephone 1104, desktop computer 1106, laptop computer 1108, and/or automobile computer system 1110 may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 1102 to offer infrastructure, platforms and/or software as services for which a cloud consumer does not need to maintain resources on a local computing device. It is understood that the types of computing devices 1104, 1106, 1108, 1110 shown in FIG. 11 are intended to be illustrative only and that computing nodes 1000 and cloud computing environment 1102 can communicate with any type of computerized device over any type of network and/or network addressable connection (e.g., using a web browser).

Figure 12:
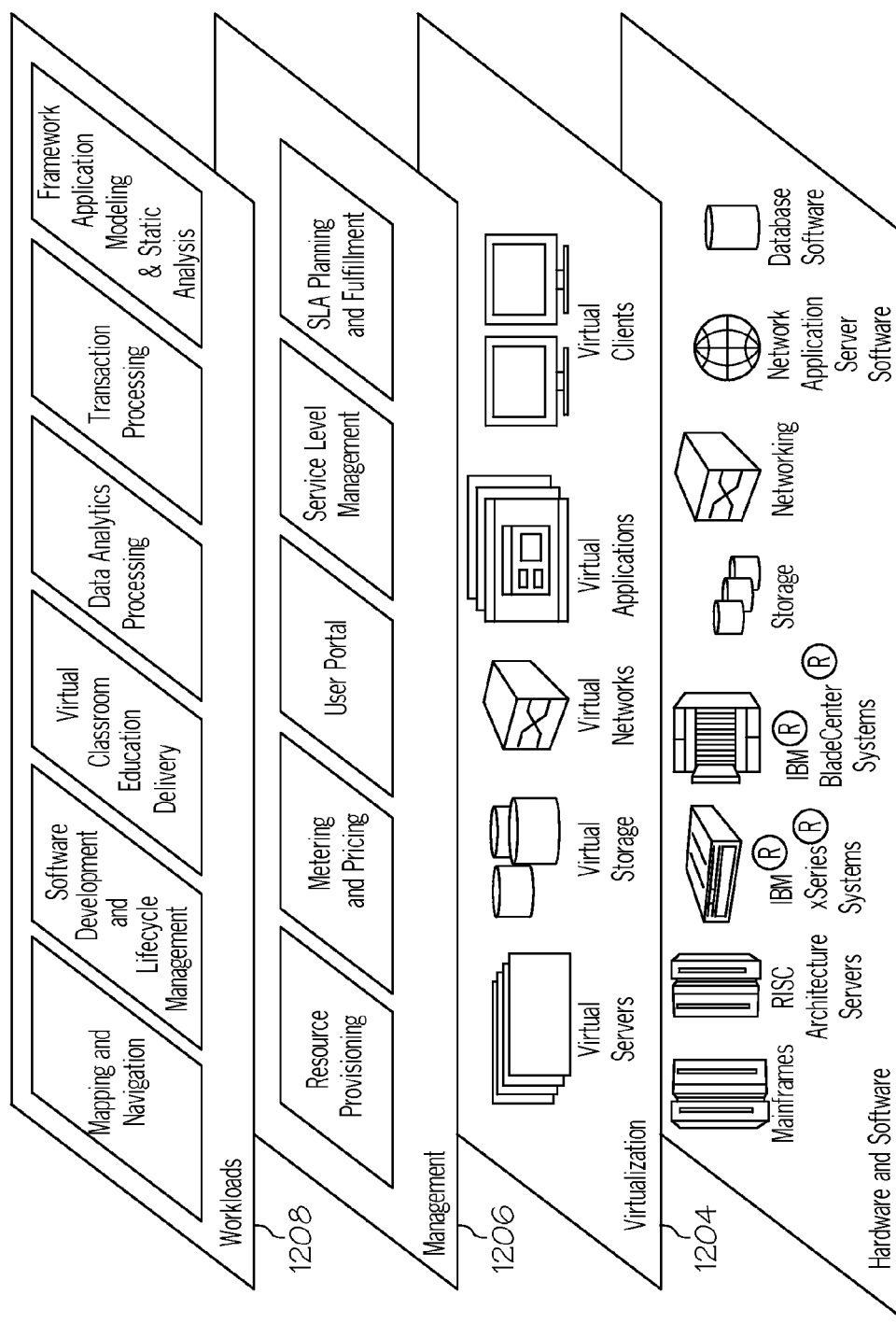
FIG. 12 illustrates abstraction model layers according to one embodiment of the present invention.

FIG. 12 shows a set of functional abstraction layers provided by cloud computing environment. The components, layers, and functions shown in FIG. 12 are intended to be illustrative only and embodiments of the invention are not limited thereto. As depicted, the following layers and corresponding functions are provided.

Hardware and software layer 1202 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 1204 provides an abstraction layer from which the following examples of virtual entities may be provided: virtual servers; virtual storage; virtual networks, including virtual private networks; virtual applications and operating systems; and virtual clients.

In one example, management layer 1206 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1208 provides examples of functionality for which the cloud computing environment may be utilized. Examples of workloads and functions which may be provided from this layer include: mapping and navigation; software development and lifecycle management; virtual classroom education delivery; data analytics processing; transaction processing; and composable software bundle and virtual image asset design and creation.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. A method for creating a data structure associated with a software application that is based on at least one framework, the method comprising:

analyzing, by at least one framework-specific processor, source code and at least one configuration file of the software application so as to determine entry point information indicating entry points in the source code, request attribute access information indicating where attributes attached to a request data structure are read and written, and forward information indicating forwards performed by the software application;

creating a data structure for a static analysis engine based on the entry point information, the request attribute access information, and the forward information, the data structure including:

a list of synthetic methods that model framework-related behavior of the software application, a list of entry points indicating at least one of the synthetic methods and application methods of the software application that can be invoked by the framework, and a list of call replacements that replace method calls in the software application with other code that exposes underlying behavior to the static analysis engine;

wherein the data structure that is created is in a framework independent format that is independent of the at least one framework on which the software application is based; and performing static analysis by the static analysis engine using the source code and the framework independent data structure.

2. The method of claim 1, wherein the software application is a web application and the framework is a web framework.

3. The method of claim 1, wherein the data structure further includes: a list of global variables that facilitate modeling of data flow through framework constructs.

4. The method of claim 1, wherein the data structure further includes: a list of global variables that facilitate modeling of data flow through framework constructs.

5. The method of claim 1, wherein the software application is based on a plurality of frameworks, and in the analyzing step, one configuration file is associated with each of the frameworks.

6. The method of claim 1, wherein the software application is based on a plurality of frameworks, and in the analyzing step, one framework-specific processor is used for each of the frameworks.

7. An information processing system for creating a data structure associated with a software application that is based on at least one framework, the information processing system comprising:
- at least one framework-specific processor for analyzing source code and at least one configuration file of the software application so as to determine entry point information indicating entry points in the source code, request attribute access information indicating where attributes attached to a request data structure are read and written, and forward information indicating forwards performed by the software application;
- a formatter for creating a data structure for a static analysis engine based on the entry point information, the request attribute access information, and the forward information, the data structure including:
  - a list of synthetic methods that model framework-related behavior of the software application,
  - a list of entry points indicating at least one of the synthetic methods and application methods of the software application that can be invoked by the framework, and
  - a list of call replacements that replace method calls in the software application with other code that exposes underlying behavior to the static analysis engine
- wherein the formatter is a framework-independent formatter that creates the data structure in a framework independent format that is independent of the at least one framework on which the software application is based; and
- a static analysis engine for performing static analysis using the source code and the framework independent data structure.

8. The information processing system of claim 7, wherein the data structure further comprises: a list of global variables that facilitate modeling of data flow through framework constructs.

9. The information processing system of claim 7, wherein the software application is based on a plurality of frameworks, and for each of the frameworks, one framework-specific processor analyzes one configuration file associated with that framework.

10. A non-transitory machine readable medium encoded with a program for creating a data structure associated with a software application that is based on at least one framework, the program comprising instructions for:
- analyzing, by at least one framework-specific processor, source code and at least one configuration file of the software application so as to determine entry point information indicating entry points in the source code, request attribute access information indicating where attributes attached to a request data structure are read and written, and forward information indicating forwards performed by the software application;
- creating a data structure for a static analysis engine based on the entry point information, the request attribute access information, and the forward information, the data structure including:
  - a list of synthetic methods that model framework-related behavior of the software application, and
  - a list of entry points indicating at least one of the synthetic methods and application methods of the software application that can be invoked by the framework; and
  - a list of call replacements that replace method calls in the software application with other code that exposes underlying behavior to the static analysis engine;
- wherein the data structure that is created is in a framework independent format that is independent of the at least one framework on which the software application is based; and
- performing static analysis by a static analysis engine using the source code and the framework independent data structure.

11. The non-transitory machine readable medium of claim 10, wherein the software application is a web application and the framework is a web framework.

12. The non-transitory machine readable medium of claim 10, wherein the data structure further comprises: a list of global variables that facilitate modeling of data flow through framework constructs.

13. The non-transitory machine readable medium of claim 10, wherein the data structure further comprises: a list of global variables that facilitate modeling of data flow through framework constructs.

14. The non-transitory machine readable medium of claim 10, wherein the software application is based on a plurality of frameworks, and for each of the frameworks, one framework-specific processor analyzes one configuration file associated with that framework.

* * * * *